United States Patent
Li

(10) Patent No.: US 9,550,883 B2
(45) Date of Patent: Jan. 24, 2017

(54) CYANOACRYLATE COMPOSITIONS

(71) Applicant: Henkel IP & Holding GmbH, Duesseldorf (DE)

(72) Inventor: Ling Li, Glastonbury, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 131 days.

(21) Appl. No.: 14/333,952

(22) Filed: Jul. 17, 2014

(65) Prior Publication Data

US 2014/0326407 A1 Nov. 6, 2014

Related U.S. Application Data

(63) Continuation of application No. PCT/US2013/021511, filed on Jan. 15, 2013.

(60) Provisional application No. 61/590,566, filed on Jan. 25, 2012.

(51) Int. Cl.
| | |
|---|---|
| C09J 11/06 | (2006.01) |
| C09J 9/00 | (2006.01) |
| C08K 5/1539 | (2006.01) |
| C09J 4/00 | (2006.01) |
| C08K 5/3415 | (2006.01) |
| C08F 222/32 | (2006.01) |

(52) U.S. Cl.
CPC ........... *C08K 5/1539* (2013.01); *C08K 5/3415* (2013.01); *C09J 4/00* (2013.01); *C08F 222/32* (2013.01)

(58) Field of Classification Search
CPC ................................. C09J 11/06; B32B 37/12
USPC ...................................................... 156/331.8
See application file for complete search history.

(56) References Cited

U.S. PATENT DOCUMENTS

| | | | |
|---|---|---|---|
| 3,832,334 | A | 8/1974 | O'Sullivan et al. |
| 4,196,271 | A | 4/1980 | Yamada et al. |
| 4,450,265 | A | 5/1984 | Harris |
| 4,490,515 | A | 12/1984 | Mariotti et al. |
| 4,532,293 | A | 7/1985 | Ikeda et al. |
| 4,556,700 | A | 12/1985 | Harris et al. |
| 4,622,414 | A | 11/1986 | McKervey |
| 4,636,539 | A | 1/1987 | Harris et al. |
| 4,695,615 | A | 9/1987 | Leonard et al. |
| 4,718,966 | A | 1/1988 | Harris et al. |
| 4,837,260 | A | 6/1989 | Sato et al. |
| 4,855,461 | A | 8/1989 | Harris |
| 4,906,317 | A | 3/1990 | Liu |
| 5,288,794 | A | 2/1994 | Attarwala |

(Continued)

FOREIGN PATENT DOCUMENTS

| | | |
|---|---|---|
| JP | 08143823 A | 6/1996 |
| JP | H08143823 A | 6/1996 |

(Continued)

OTHER PUBLICATIONS

Millet, G. H. "Cyanoacrylate Adhesives." Structural Adhesives. Plenum Press, 1986. pp. 249, 273-275, 303-307.

(Continued)

*Primary Examiner* — Daniel Lee
(74) *Attorney, Agent, or Firm* — Steven C. Bauman

(57) ABSTRACT

Cyanoacrylate-containing compositions that include, in addition to the cyanoacrylate component, an anhydride and a maleimide-, itaconimide-, or nadimide-containing compound, are provided. Cured products of the inventive cyanoacrylate compositions demonstrate improved moisture and/or heat resistance.

19 Claims, 2 Drawing Sheets

(56) References Cited

U.S. PATENT DOCUMENTS

| | | | |
|---|---|---|---|
| 5,312,864 | A | 5/1994 | Wenz et al. |
| 5,530,037 | A | 6/1996 | McDonnell et al. |
| 6,607,632 | B1 | 8/2003 | McDonnell et al. |
| 6,806,309 | B2 | 10/2004 | Jaeger |
| 7,312,534 | B2 | 12/2007 | Delos et al. |
| 8,734,939 | B2 | 5/2014 | Herr et al. |
| 2003/0199638 | A1 | 10/2003 | Liu et al. |
| 2008/0314519 | A1* | 12/2008 | Attarwala .......... C09J 123/0869 156/331.8 |
| 2009/0163028 | A1 | 6/2009 | Jung |

FOREIGN PATENT DOCUMENTS

| | | |
|---|---|---|
| JP | 2000290599 A | 10/2000 |
| JP | 20000290599 A | 10/2000 |
| JP | 2005519150 | 6/2005 |
| JP | 2005521764 | 7/2005 |
| JP | 2005532678 | 10/2005 |
| JP | 2011012124 | 1/2011 |
| JP | 2011101977 | 5/2011 |
| KR | 1020080035606 A | 4/2008 |
| WO | 2010144774 A2 | 12/2010 |

OTHER PUBLICATIONS

Coover et al., "Cyanoacrylate Adhesives", Loctite Corporation, pp. 463-477.

Hartshorn, "Structural Adhesives" Chemistry and Technology, Plenum Press, 11 pages.

International Search Report for PCT/US2013/021511.

\* cited by examiner

CYANOACRYLATE COMPOSITIONS

BACKGROUND

1. Field

This invention relates to cyanoacrylate-containing compositions that include, in addition to the cyanoacrylate component, an anhydride and a maleimide-, itaconimide-, or nadimide-containing compound. Cured products of the inventive cyanoacrylate compositions demonstrate improved humidity and/or heat resistance.

2. Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

U.S. Pat. No. 5,288,794 (Attarwala) is directed to an improved cyanoacrylate monomer adhesive formulation, where an effective amount, for enhancing the thermal resistance of the polymerized adhesive, of a mono, poly or hetero aromatic compound characterized by at least three substitutions on an aromatic ring thereof, two or more of the substitutions being electron withdrawing groups, is provided. Examples of the aromatic compound are given as 2,4-dinitrofluorobenzene; 2,4-dinitrochlorobenzene; 2,4-difluoronitrobenzene; 3,5-dinitromaleimide-, itaconimide-, or nadimide-containing compound; 2-chloro-3,5-dinitromaleimide-, itaconimide-, or nadimide-containing compound; 4,4'-difluoro-3,3'-dinitrophenyl sulfone; pentafluoronitrobenzene; pentafluoromaleimide-, itaconimide-, or nadimide-containing compound; α,α,α-2-tetrafluoro-p-tolunitrile and tetrachloroterphthalonitrile.

Prior to the discovery in the '794 patent, numerous attempts have been made to improve the thermal stability of cyanoacrylate adhesive bonds.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lapshears than in those of aluminium).

U.S. Pat. No. 4,532,293 is directed to the use of benzephenonetetracarboxylic acid or its anhydride and is said to provide a superior heat resistance for cyanoacrylate adhesives.

U.S. Pat. No. 4,490,515 is directed to cyanoacrylate compositions containing certain maleimide or nadimide compounds to improve hot strength properties.

Notwithstanding the state of the art and the efforts to date to improve the heat resistance of cyanoacrylate compositions, there remains a long felt, yet unmet, need to provide such moisture and/or heat resistance to cured reaction products of such cyanoacrylate compositions, particularly without compromising other physical properties like fixture time, stability or color of the cyanoacrylate compositions themselves. Until now.

SUMMARY

Cyanoacrylate compositions, which include beyond the cyanoacrylate component, an anhydride and a maleimide-, itaconimide-, or nadimide-containing compound, are thus provided.

The inclusion of the anhydride and the maleimide-, itaconimide-, or nadimide-containing compound, provides for improved properties, such as humidity and/or heat resistance, without compromising fixture speeds, stability and/or color, when compared to comparable cyanoacrylate compositions, (1) without either an anhydride or (2) a maleimide-, itaconimide-, or nadimide-containing compound, with one, but not the other and with an anhydride itself, as is shown in the Examples.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions, and a method of conferring improved humidity and/or thermal resistance to a cured reaction product of a cyanoacrylate composition, without compromising at least one of fixture time, stability or color.

The invention will be more fully understood by a reading of the section entitled "Detailed Description", which follows.

DETAILED DESCRIPTION

Figure 1:
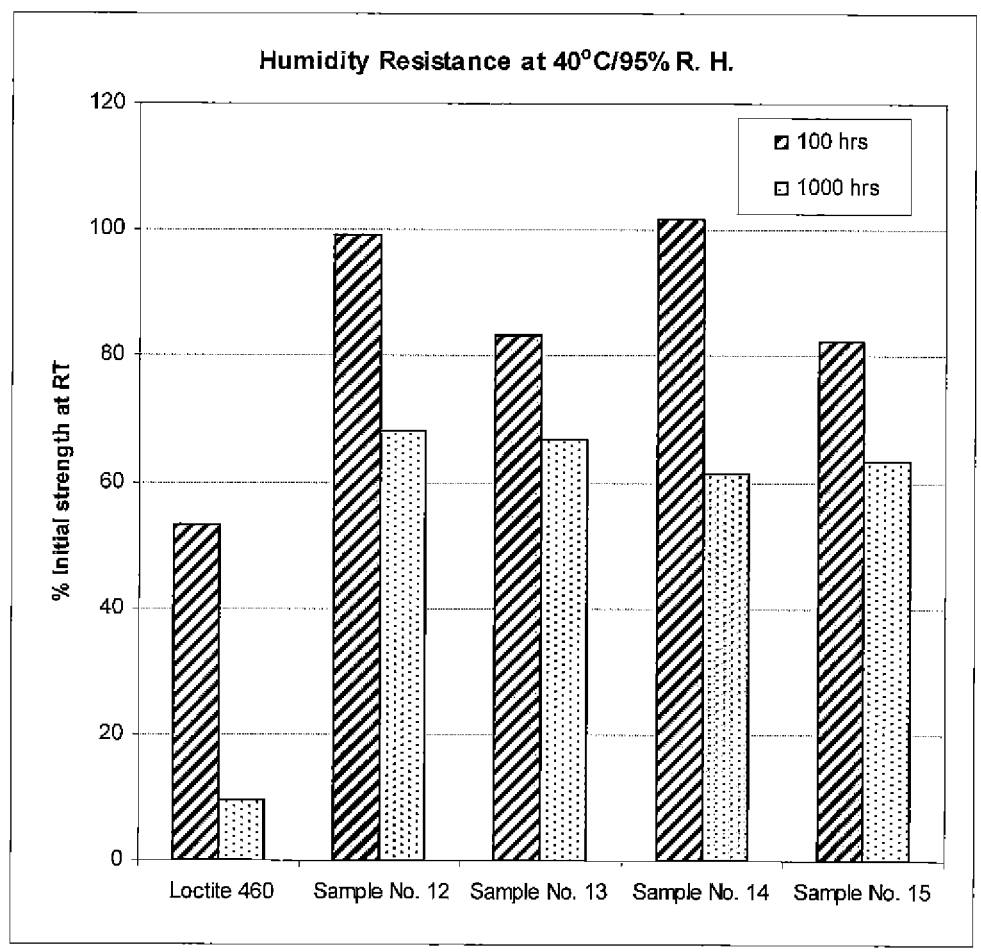
FIG. 1 depicts a bar chart of lap shear strength retained after humidity aging for a period of time of 100 hours and 1,000 hours for a cyanoacrylate composition with two different anhydrides, one of which being present at two different levels, and a maleimide-containing compound compared with a control, LOCTITE 460, on grit blasted mild steel substrates.

As noted above, this invention is directed to a cyanoacrylate composition, which includes beyond the cyanoacrylate component, an anhydride and a maleimide-, itaconimide-, or nadimide-containing compound.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is β-methoxyethyl cyanoacrylate.

The cyanoacrylate component should be included in the compositions in an amount within the range of from about 50% to about 99.98% by weight, with the range of about 90% to about 99% by weight being desirable, and about 95% by weight of the total composition being particularly desirable.

The anhydride ordinarily should be an aromatic anhydride, such as phthalic anhydride, or hydrogenated versions thereof, such as 3,4,5,6-tetrahydro phthalic anhydride. Isomeric versions thereof and partially hydrogenated versions of phthalic anhydride may also be used. In addition, aliphatic anhydrides may also be used, such as dimethyl maleic anhydride.

The maleimide-, nadimide-, or itaconimide-containing compound should be chosen from

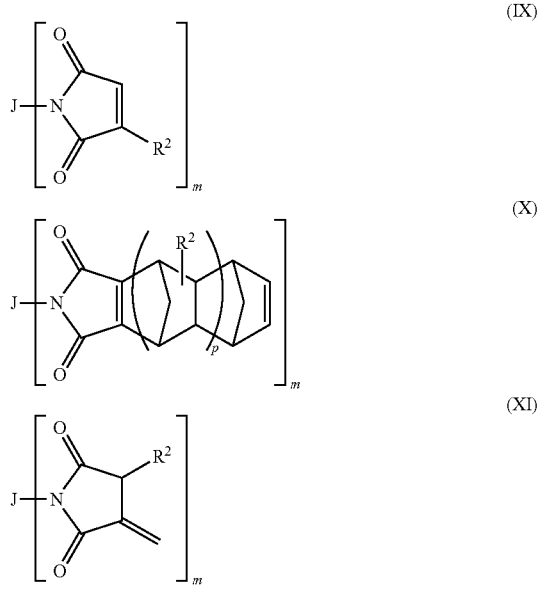

where m can range from 1 to 15, p can range from 0 to 15, each $R^2$ is independently selected from hydrogen or lower alkyl, and J is a monovalent or a polyvalent moiety comprising organic or organosiloxane radicals, and combinations of two or more thereof.

More specific representations of the maleimides, nadimides and itaconimides include those corresponding to structures IX, X, or XI, where m ranges from 1 to 6, p is 0, $R^2$ is independently selected from hydrogen or lower alkyl, and J is a monovalent or polyvalent radical selected from hydrocarbyl, substituted hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxane, polysiloxane-polyurethane block copolymer, and combinations of two or more thereof, optionally containing one or more linkers selected from a covalent bond, —O—, —S—, —NR—, —O—C(O)—, —O—C(O)—O—, —O—C(O)—NR—, —NR—C(O)—, —NR—C(O)—O—, —NR—C(O)—NR—, —S—C(O)—, —S—C(O)—O—, —S—C(O)—NR—, —S(O)—, —S(O)$_2$—, —O—S(O)$_2$—, —O—S(O)$_2$—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)$_2$—, —O—NR—S(O)$_2$—O—, —O—NR—S(O)$_2$—NR—, —O—NR—S(O)—NR—, —O—P(O)R$_2$O—, —S—P(O)R$_2$—, —NR—P(O)R$_2$—, where each R is independently hydrogen, alkyl or substituted alkyl, and combinations of any two or more thereof.

When one or more of the above described monovalent or polyvalent groups contain one or more of the above described linkers to form the "J" appendage of a maleimide, nadimide, or itaconimide group, as readily recognized by those of skill in the art, a wide variety of linkers can be produced, such as, for example, oxyalkyl, thioalkyl, aminoalkyl, carboxylalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoaryl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl, thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl, oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenylene, aminocycloalkenylene, carboxycycloalkenylene, oxyarylene, thioarylene, aminoarylene, carboxyarylene, oxyalkylarylene, thioalkylarylene, aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyalkenylarylene, thioalkenylarylene, aminoalkenylarylene, carboxyalkenylarylene, oxyarylalkynylene, thioarylalkynylene, aminoarylalkynylene, carboxy arylalkynylene, oxyalkynylarylene, thioalkynylarylene, aminoalkynylarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, carboxyheteroatom-containing di- or polyvalent cyclic moiety, disulfide, sulfonamide, and the like.

Maleimides, nadimides, and itaconimides may also have m ranges from 1 to 6, p ranges between 0 and 6, and J is selected from:

saturated straight chain alkyl or branched chain alkyl, optionally containing optionally substituted aryl moieties as substituents on the alkyl chain or as part of the backbone of the alkyl chain, and where the alkyl chains have up to about 20 carbon atoms;

a siloxane having the structure

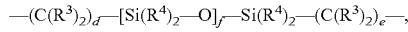

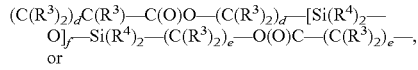

or

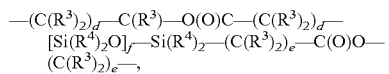

where each $R^3$ is independently hydrogen, alkyl or substituted alkyl, each $R^4$ is independently hydrogen, lower alkyl or aryl, d ranges from 1 to 10, e ranges between 1 and 10, and f ranges from 1 to 50; a polyalkylene oxide having the structure:

$$[(CR_2)_r\text{—}O\text{—}]_f\text{—}(CR_2)_s\text{—} \quad \text{(XII)}$$

where each R is independently hydrogen, alkyl or substituted alkyl, r is between 1 and 10, s is between 1 and 10, and f ranges from 1 to 50; aromatic groups having the structure:

where each Ar is a monosubstituted, disubstituted, or trisubstituted aromatic or heteroaromatic ring having in the range of 3 up to 10 carbon atoms, and Z is saturated straight chain alkylene or branched chain alkylene, optionally containing saturated cyclic moieties as substituents on the alkylene chain or as part of the backbone of the alkylene chain; polyalkylene oxides having the structure:

$$[(CR_2)_r\text{—}O\text{—}]_q\text{—}(CR_2)_s\text{—} \quad \text{(XIV)}$$

where each R is independently hydrogen, alkyl, or substituted alkyl, r is between 1 and 10, s is between 1 and 10, and q falls in the range of 1 up to 50; di- or tri-substituted aromatic moieties having the structure:

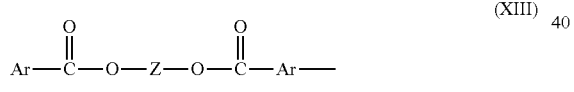

where each R is independently hydrogen, alkyl, or substituted alkyl, t falls in the range of 2 up to 10, u falls in the range of 2 up to 10, and Ar is a monosubstituted, disubstituted, or trisubstituted aromatic or heteroaromatic ring having in the range of 3 up to 10 carbon atoms; aromatic groups having the structures:

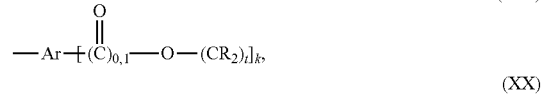

where each R is independently hydrogen, alkyl, or substituted alkyl, t is from 2 to 10, k is 1, 2, or 3, g ranges from 1 up to about 50, each Ar is as defined above, E is —O— or —$NR^5$— where $R^5$ is hydrogen or lower alkyl, and W is straight or branched chain alkyl, alkylene, oxyalkylene, ester, or polyester, a siloxane having the structure

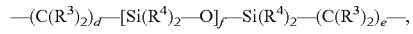

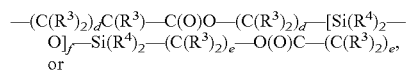

or

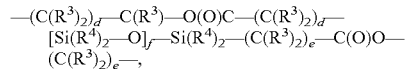

where each $R^3$ is independently hydrogen, alkyl, or substituted alkyl, each $R^4$ is independently hydrogen, lower alkyl, or substituted aryl, d and e are each from 1 to 10, and f is from 1 to 50; a polyalkylene oxide having the structure:

$$\text{—}[(CR_2)_r\text{—}O\text{—}]_f\text{—}(CR_2)_s\text{—} \quad \text{(XXII)}$$

where each R is independently hydrogen, alkyl, or substituted alkyl, r and s each range from 1 to 10, and f is from 1 to 50, optionally containing substituents selected from hydroxy, alkoxy, carboxy, nitrile, cycloalkyl, or cycloalkenyl; a urethane group having the structure:

$$R^7U\text{—}C(O)\text{—}NR^6\text{—}R^8\text{—}NR^6\text{—}C(O)\text{—}(O\text{—}R^8\text{—}$$
$$O\text{—}C(O)NR^6\text{—}R^8\text{—}NR^6\text{—}C(O))_v\text{—}U\text{—}R^8\text{—} \quad \text{(XXIII)}$$

where each $R^6$ is independently hydrogen or lower alkyl, each $R^7$ is independently an alkyl, aryl, or arylalkyl group having 1 to 18 carbon atoms, each $R^8$ is an alkyl or alkyloxy chain having up to about 100 atoms in the chain, optionally substituted with Ar, U is —O—, —S—, —N(R)—, or —P(L)$_{1,2}$-, where R is as defined above, and where each L is independently =O, =S, —OR, or —R, and v ranges from 0 to 50; polycyclic alkenyl; or mixtures of any two or more thereof.

Particularly desirable maleimide-containing compounds include those have two maleimide groups with an aromatic group therebetween, such as a phenyl, biphenyl, bisphenyl or napthyl linkage.

The anhydride should be used in an amount up to about 1.0% by weight, such as within the range of about 0.01 to about 0.5%, desirably within the range of about 0.05 to about 0.2% by weight.

The maleimide-, itaconimide-, or nadimide-containing compound should be present in an amount up to about 5% by weight, like about 0.01% to about 3% by weight, such as about 0.1% to about 2% by weight, with about 1% by weight being particularly desirable.

Desirably, the anhydride should be used in an amount of up to about 0.01% by weight to about 0.5% by weight, and the maleimide-, itaconimide-, or nadimide-containing compound should be used in an amount of about 0.1% to about 2% by weight.

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

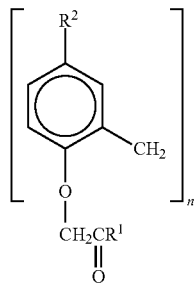

where in this regard $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, any one or more of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7 may be used. See U.S. Pat. No. 4,837,260 (Sato), the disclosure of which is hereby expressly incorporated herein by reference. Of the silacrowns, again many are known, and are reported in the literature.

Specific examples of silacrown compounds useful in the inventive compositions include:

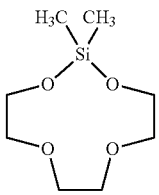

dimethylsila-11-crown-4;

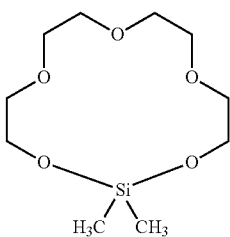 [SMILES: C[Si]1(C)OCCOCCOCCOCCO1]

dimethylsila-14-crown-5;

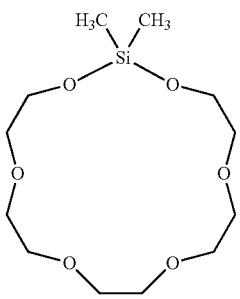 [SMILES: C[Si]1(C)OCCOCCOCCOCCOCCO1]

and dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

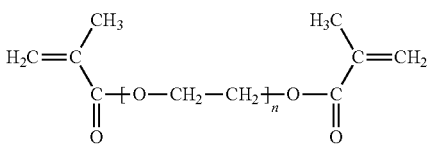

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

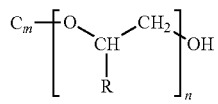

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive cyanoacrylate compositions, such as certain acidic materials (like citric acid), thixotropy or gelling agents, thickeners (like polymethylmethacrylate), dyes, and combinations thereof.

In another aspect of the invention, there is provided a method of bonding together two substrates, which method includes applying to at least one of the substrates a composition as described above, and thereafter mating together the substrates for a time sufficient to permit the adhesive to fixture.

In yet another aspect of the invention, there is provided reaction products of the so-described compositions.

In still another aspect of the invention, there is provided a method of preparing the so-described compositions. The method includes providing a cyanoacrylate component, and combining therewith with mixing an anhydride and a maleimide-, itaconimide-, or nadimide-containing compound.

The invention will be further illustrated by the examples which follow.

EXAMPLES

All samples were prepared by mixing together the noted constituents for a period of time of about 30 minutes.

TABLE 1

| Component | | Sample No./Amt. (wt. %) | | | | | | |
|---|---|---|---|---|---|---|---|---|
| Type | Identity | 1 | 2 | 3 | 4 | 5 | 6 | 7 |
| CA | β-methoxyethyl cyanoacrylate | Balance | Balance | Balance | Balance | Balance | Balance | Balance |
| Anhydride | Phthalic anhydride | — | — | — | 0.1 | 0.2 | 0.1 | 0.1 |
| Maleimide | N,N'-(2,2'-Diethyl-6,6'-Dimethyl-4,4'-Methylene diphenylene)-Bismaleimide | — | 1 | 2 | — | — | 1 | 2 |
| | Stabilizer Package | 0.001 | 0.001 | 0.001 | 0.001 | 0.001 | 0.001 | 0.001 |

With reference to Table 1 above, seven samples were prepared with a β-methoxyethyl cyanoacrylate base. Sample No. 1 was used as a control with neither anhydride nor maleimide added; Sample Nos. 2 and 3 were used as controls with a maleimide added at different levels and Sample Nos. 3 and 4 were used as controls with an anhydride added at different levels. Sample Nos. 6 and 7 included the combination of anhydride and maleimide with the anhydride level kept constant.

Table 2 below shows the humidity and heat aging results of these seven samples. More specifically, each of the seven samples was applied to a grit blasted mild steel lap shear substrate over which was mated another grit blasted mild steel lap shear substrate in an off set manner so that an overlapped bond line may be formed in the lap shear assembly. Replicates of five specimens were prepared for each sample. One set of the assemblies were placed under the humidity conditions for the time noted, after which the lap shear strength was determined by placing a force on opposite ends of the assembly to pull them apart in a lateral manner. The other set of the assemblies were placed under heat aging conditions for the time noted, and the lap shear strength determined in the same manner.

TABLE 2

| | | Sample No. | | | | | | |
|---|---|---|---|---|---|---|---|---|
| Physical Properties | | 1 | 2 | 3 | 4 | 5 | 6 | 7 |
| Initial lapshear strength (Psi) | 24 hours RTC | 2424 | 2464 | 2829 | 2396 | 2832 | 2748 | 2485 |

TABLE 2-continued

| Physical Properties | | Sample No. | | | | | | |
|---|---|---|---|---|---|---|---|---|
| | | 1 | 2 | 3 | 4 | 5 | 6 | 7 |
| Lapshear strength (aged @ 40° C./95% R.H.), Psi | 168 hours | 1704 | 1899 | 1884 | 1815 | 1555 | 2378 | 2525 |
| Lapshear Strength (aged @ 100° C.), Psi | 168 hours | 2294 | 2587 | 2243 | — | 2281 | 2700 | 3194 |

As may be seen from Table 2, both the strength retained between the initial measurement and the measurement after 168 hours of humidity aging for Sample Nos. 6 and 7, and the strength observed after 168 hours of heat aging for Sample Nos. 6 and 7 compared with any of Sample Nos. 1-3 and 5, show a remarkable increase.

With reference to Table 3 below, like Table 1 above, eight samples were prepared with a β-methoxyethyl cyanoacrylate base. Sample Nos. 8 and 9 were used as controls with neither anhydride nor maleimide added; Sample No. 11 was used as a control with a maleimide added and Sample No. 10 was used as a control with an anhydride added. Sample Nos. 12-15 included the combination of anhydride and maleimide with different anhydrides and the maleimide level kept constant.

samples recorded in Table 2, each of the ten samples (the eight from Table 3 and the commercially available LOC-TITE 460 and 408) was applied to a grit blasted mild steel lap shear substrate over which was mated another grit blasted mild steel lap shear substrate in an offset manner so that an overlapped bond line may be formed in the lap shear assembly. Replicates of five specimens were prepared for each sample. One set of the assemblies were placed under the humidity conditions for the time noted, after which the lap shear strength was determined by placing a force on opposite ends of the assembly to pull them apart in a lateral manner. The other set of the assemblies were placed under

TABLE 3

| Component | | Sample No./Amt. (wt. %) | | | | | | | |
|---|---|---|---|---|---|---|---|---|---|
| Type | Identity | 8 | 9 | 10 | 11 | 12 | 13 | 14 | 15 |
| CA | β-methoxyethyl Cyanoacrylate | Balance | Balance | Balance | Balance | Balance | Balance | Balance | Balance |
| Thickener | PMMA | 3.3 | 3.3 | 3.3 | 3.3 | 3.3 | 3.3 | — | 3.6 |
| Accelerator | Crown ether | — | 0.08 | 0.2 | 0.2 | 0.2 | 0.2 | 0.08 | 0.2 |
| Anhydride | Phthalic anhydride | — | — | 0.5 | — | 0.5 | — | 0.1 | 0.1 |
| | 2,3-dimethylmaleic anhydride | — | — | — | — | — | 0.9 | — | — |
| Maleimide | N,N'-(2,2'-Diethyl-6,6'-Dimethyl-4,4'-Methylene diphenylene)-Bismaleimide | — | — | — | 2 | 2 | 2 | 2 | 2 |
| Filler | Silica | — | — | — | — | — | — | — | 4.3 |
| | Stabilizer package | 0.0005 | 0.0005 | 0.0005 | 0.0005 | 0.0005 | 0.0005 | 0.0005 | 0.0045 |

Table 4 below shows the humidity and heat aging results of these seven samples. More specifically, and like the heat aging conditions for the time noted, and the lap shear strength determined in the same manner.

TABLE 4

| Physical Properties | | Sample No. | | | | | | | | |
|---|---|---|---|---|---|---|---|---|---|---|
| | | 8 | 9 | 10 | 11 | 12 | 13 | 14 | 15 | 16 | 17 |
| Initial lapshear strength (Psi) | 24 hours RTC | 2724 | 2763 | 2834 | 2679 | 2856 | 2873 | 2561 | 2957 | 2938 | 2431 |
| Lapshear strength (aged @ 40° C./95% R.H.), Psi | 100 hours | — | 1415 | 2671 | 2055 | 2828 | 2391 | 2606 | 2434 | 1567 | 1480 |
| | 1000 hours | 230 | 568 | 1035 | 1398 | 1948 | 1915 | 1575 | 1873 | 279 | 331 |

TABLE 4-continued

| Physical Properties | | 8 | 9 | 10 | 11 | 12 | 13 | 14 | 15 | 16 | 17 |
|---|---|---|---|---|---|---|---|---|---|---|---|
| Lapshear Strength (aged @ 100° C.), Psi | 168 hours | 1428 | 1546 | 2040 | 1553 | 2850 | — | 2747 | 2597 | 1582 | 1796 |
| | 1000 hours | 550 | 731 | 1080 | 700 | 1563 | — | 2253 | 2045 | 731 | 322 |

Figure 2:
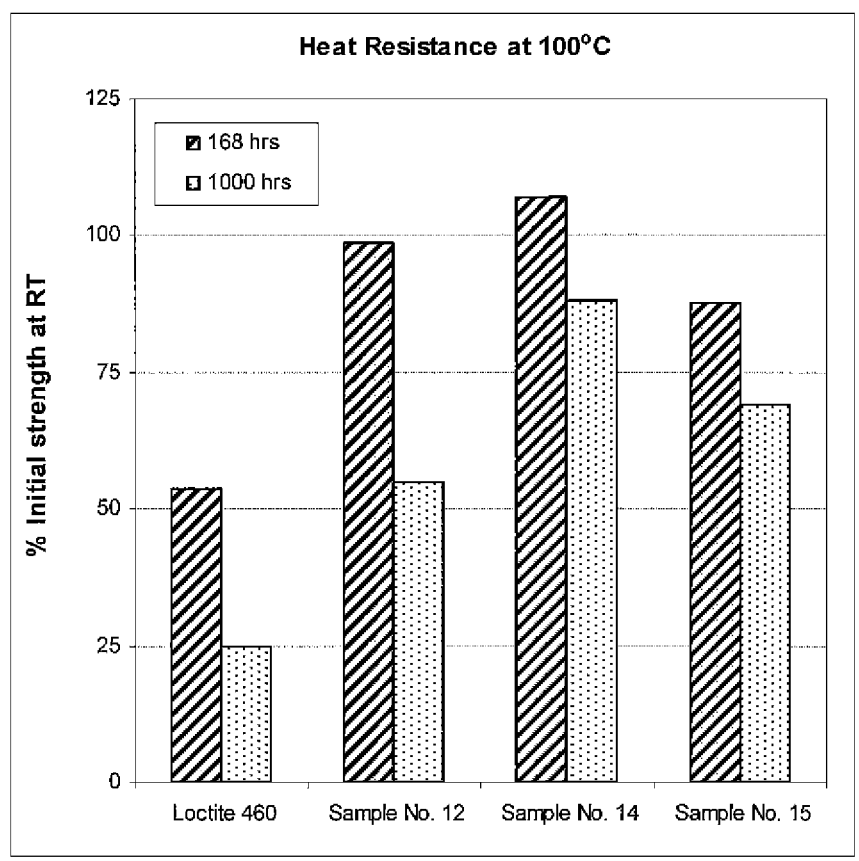
FIG. 2 depicts a bar chart of lap shear strength retained after heat aging for a period of time of 168 hours and 1,000 hours for a cyanoacrylate composition with an anhydride at two different levels and a maleimide-containing compound compared with a control, LOCTITE 460, on grit blasted mild steel substrates.

16: PRISM 460, commercially available from Henkel Corporation, Rocky Hill, CT
17: PRISM 408, commercially available from Henkel Corporation, Rocky Hill, CT As may be seen from Table 4, both the strength retained between the initial measurement and the measurement after 100 and 1000 hours of humidity aging for Sample Nos. 12-15, and the strength observed after 168 and 1000 hours of heat aging for Sample Nos. 12 and 14-15 compared with any of Sample Nos. 8-11 and 16-17, show a remarkable increase. See also FIGS. 1 and 2, respectively, for bar chart depictions of humidity and heat aging data of a selection of these samples.

Conventional ethyl cyanoacrylate compositions have an upper limit on their operating temperature of about 80° C. That is, above such temperature, a cured cyanoacrylate composition oftentimes shows the beginning of degradation and thus a sacrifice of bond strength. Additive chemistry (such as phthalic anhydride) has allowed this limit to be increased, but cyanoacrylate compositions with such an additive suffer from increased fixture times, which is an undesirable observation.

The use of a maleimide-, itaconimide-, or nadimide-containing compound in combination with an anhydride allows for the formulation of cyanoacrylate compositions, which when cured demonstrate improved humidity and/or heat aging resistance.

What is claimed is:

1. A cyanoacrylate adhesive composition, comprising:
   (a) a cyanoacrylate component,
   (b) an anhydride in an amount within the range of about 0.01% to about 1% by weight, wherein the anhydride is dimethyl maleic anhydride, and
   (c) a maleimide-, itaconimide-, or nadimide-containing compound in an amount within the range of about 0.01% to about 3% by weight.

2. The composition according to claim 1, wherein the anhydride is a phthalic anhydride.

3. The composition of claim 1, further comprising a stabilizing amount of an acidic stabilizer and a free radical inhibitor.

4. The composition according to claim 1, wherein the cyanoacrylate component is selected from materials within the structure $H_2C=C(CN)-COOR$, wherein R is selected from $C_{1-15}$ alkyl, alkoxyalkyl, cycloalkyl, alkenyl, aralkyl, aryl, allyl and haloalkyl groups.

5. The composition according to claim 1, wherein the cyanoacrylate component comprises β-methoxyethyl-2-cyanoacrylate.

6. The composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

7. The composition according to claim 6, wherein the calixarene is tetrabutyl tetra[2-ethoxy-2-oxoethoxy]calix-4-arene.

8. The composition according to claim 6, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

9. The composition according to claim 6, wherein the poly(ethyleneglycol) di(meth)acrylate is within the following structure:

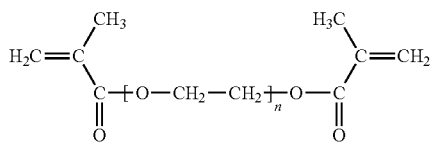

wherein n is greater than 3.

10. The composition according to claim 1, further comprising additives selected from the group consisting of shock resistant additives, thixotropy conferring agents, thickeners, dyes, and combinations thereof.

11. Reaction products of the composition according to claim 1.

12. A method of bonding together two substrates, comprising the steps of:
   applying a cyanoacrylate adhesive composition according to claim 1, to at least one of the substrates and
   mating together the substrates for a time sufficient to permit the adhesive to fixture.

13. A method of preparing a cyanoacrylate-adhesive composition according to claim 1, comprising the steps of:
   providing a cyanoacrylate component, and
   combining therewith with mixing an anhydride in an amount within the range of about 0.01% to about 1% by weight and a maleimide-, itaconimide-, or nadimide-containing compound in an amount within the range of about 0.01% to about 3% by weight, wherein the anhydride is dimethyl maleic anhydride.

14. A method of conferring improved humidity and/or thermal resistance to a cured product of a cyanoacrylate composition, comprising the steps of:
   providing a cyanoacrylate composition; and
   providing thereto with mixing an anhydride in an amount within the range of about 0.01% to about 1% by weight and a maleimide-, itaconimide-, or nadimide-containing compound in an amount within the range of about 0.01% to about 3% by weight, wherein the anhydride is dimethyl maleic anhydride.

15. In a cyanoacrylate composition comprising a cyanoacrylate component, wherein the improvement comprises adding to the cyanoacrylate component an anhydride in an amount within the range of about 0.01% to about 1% by weight and a maleimide-, itaconimide-, or nadimide-containing compound in an amount within the range of about 0.01% to about 3% by weight to improve the humidity and/or heat resistance of cured reaction products thereof, wherein the anhydride is dimethyl maleic anhydride.

16. The composition according to claim 1, wherein the anhydride is present in amount within the range of about 0.05 to about 0.2% by weight.

17. The composition according to claim 1, wherein the maleimide-, itaconimide-, or nadimide-containing compound is present in amount within the range of about 0.1% to about 2% by weight.

18. The composition according to claim 1, wherein the anhydride present in an amount of up to about 0.01% by weight to about 0.5% by weight and the maleimide-, itaconimide-, or nadimide-containing compound is present in an amount of about 0.1% to about 2% by weight.

19. The composition according to claim 1, wherein the anhydride present in an amount of about 0.1% by weight and the maleimide-, itaconimide-, or nadimide-containing compound is present in an amount of about 2% by weight.

* * * * *